US 8,857,079 B2

(12) United States Patent
Mueller (10) Patent No.: US 8,857,079 B2
(45) Date of Patent: Oct. 14, 2014

(54) SNOW GROOMER AND RELATIVE CONTROL METHOD (75) Inventor: Jan Mueller, Frastanz (AT)

(73) Assignee: Snowgrolic S.AR.L., Luxembourg (LU)

( * ) Notice: Subject to any disclaimer, the term of this patent is extended or adjusted under 35 U.S.C. 154(b) by 484 days.

(21) Appl. No.: 13/256,083

(22) PCT Filed: Mar. 12, 2010

(86) PCT No.: PCT/EP2010/053226
§ 371 (c)(1),
(2), (4) Date: Jan. 23, 2012

(87) PCT Pub. No.: WO2010/103117
PCT Pub. Date: Sep. 16, 2010

(65) Prior Publication Data
US 2012/0117832 A1 May 17, 2012

(30) Foreign Application Priority Data
Mar. 12, 2009 (IT) .............................. MI2009A0379

(51) Int. Cl.
*E01H 4/00* (2006.01)
*E01H 4/02* (2006.01)
*F02D 41/00* (2006.01)
*F02D 41/10* (2006.01)
*F02D 41/14* (2006.01)
*F02D 41/02* (2006.01)

(52) U.S. Cl.
CPC ............. *F02D 41/1497* (2013.01); *Y02T 10/42* (2013.01); *E01H 4/02* (2013.01); *F02D 41/0002* (2013.01); *F02D 41/10* (2013.01); *F02D 41/021* (2013.01); *F02D 2250/18* (2013.01)
USPC ......................................... 37/221

(58) Field of Classification Search
CPC ...... B62D 49/08; B62D 55/30; B62D 55/116; E02F 9/2235; E02F 9/2246; E01H 4/02; E01H 2004/026; F02D 29/02; F02D 11/105; F02D 41/021; F02D 41/1497; F02D 41/10; F02D 41/0002
USPC ................... 37/197, 219–229, 266; 172/2–11; 701/50–54, 99, 101, 469
See application file for complete search history.

(56) References Cited

U.S. PATENT DOCUMENTS

| 5,363,937 | A | 11/1994 | James |
| 6,637,134 | B2 | 10/2003 | Hammerle |
| 7,025,158 | B2 | 4/2006 | Kanzler et al. |
| 7,299,569 | B2 * | 11/2007 | Kanzler .......................... 37/221 |

(Continued)

FOREIGN PATENT DOCUMENTS

| CA | 2243418 C | 11/2002 |
| EP | 0895495 B | 10/2000 |
| WO | WO 92/08278 A | 5/1992 |
| WO | WO 94/09548 A | 4/1994 |

*Primary Examiner* — Robert Pezzuto
(74) *Attorney, Agent, or Firm* — Frommer Lawrence & Haug LLP; Ronald R. Santucci (57) ABSTRACT A snow groomer has a first and second track; an internal combustion engine; a plurality of working devices; a user interface; a power transmission; a first computing block for determining a total power demand of the working devices; and a second computing block for determining a work point in a characteristic graph of the internal combustion engine as a function of total power demand and the fuel consumption of the internal combustion engine.

23 Claims, 6 Drawing Sheets

(56) References Cited

U.S. PATENT DOCUMENTS

| | | | |
|---|---|---|---|
| 7,774,117 B2* | 8/2010 | Ozawa et al. | 701/54 |
| 8,175,790 B2* | 5/2012 | Stemler et al. | 701/110 |
| 2002/0156574 A1* | 10/2002 | Fortin | 701/213 |
| 2004/0088103 A1 | 5/2004 | Itow et al. | |
| 2004/0144000 A1 | 7/2004 | Kanzler | |
| 2006/0128521 A1 | 6/2006 | Fukushima et al. | |

* cited by examiner

SNOW GROOMER AND RELATIVE CONTROL METHOD

This application is a 371 of PCT/EP2010/053226 filed on Mar. 12, 2010, published on Sep. 16, 2010 under publication number WO 2010/103117 A and which claims priority benefits to Italian Patent Application No. MI2009 A 000379 filed Mar. 12, 2009, the entire disclosure of which is incorporated herein by reference.

TECHNICAL FIELD

The present invention relates to a ski slope snow groomer and relative control method.

More specifically, the present invention relates to a snow groomer comprising a first and second track; an internal combustion engine; a power transmission; a plurality of working devices connected to the internal combustion engine by the power transmission; a user interface; and a control unit comprising a first computing block for determining a total power demand of the working devices.

BACKGROUND ART

A snow groomer of the above type is known from EP 0895495 B1.

The power transmission between the internal combustion engine and the working devices may be predominantly or all-electric, as described in WO 94/09548, U.S. Pat. No. 5,363,937 and WO 92/08278.

A snow groomer is normally driven by an operator controlling vehicle direction using the steering device, and vehicle speed and power to the drive wheels using the accelerator pedal.

One drawback of the known art is that the internal combustion engine is controlled solely to meet total power demand of the working devices, as opposed to improving efficiency.

DISCLOSURE OF INVENTION

It is an object of the present invention to provide a snow groomer designed to eliminate the drawbacks of the known art.

Another object is to provide a highly efficient snow groomer in terms of energy consumption.

According to the present invention, there is provided a snow groomer comprising a first and second track; an internal combustion engine; a power transmission; a plurality of working devices connected to the internal combustion engine by the power transmission; a user interface; and a control unit comprising a first computing block for determining a total power demand of said working devices, and a second computing block for determining a work point in a characteristic graph of the internal combustion engine as a function of total power demand and the fuel consumption of the internal combustion engine; wherein the second computing block determines the work point in the characteristic graph of the internal combustion engine as a function of a power reserve of the internal combustion engine.

The second computing block for determining the work point provides for achieving optimum fuel consumption of the snow groomer.

Another object of the present invention is to provide a method of controlling a snow groomer to achieve optimum consumption.

According to the present invention, there is provided a method of controlling a snow groomer; the snow groomer comprising a first and second track; an internal combustion engine; a power transmission; a plurality of working devices connected to the internal combustion engine by the power transmission; and a user interface; the method comprising the steps of determining a total power demand of said working devices; and determining a work point in a characteristic graph of the internal combustion engine as a function of total power demand, the fuel consumption and a power reserve of the internal combustion engine.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
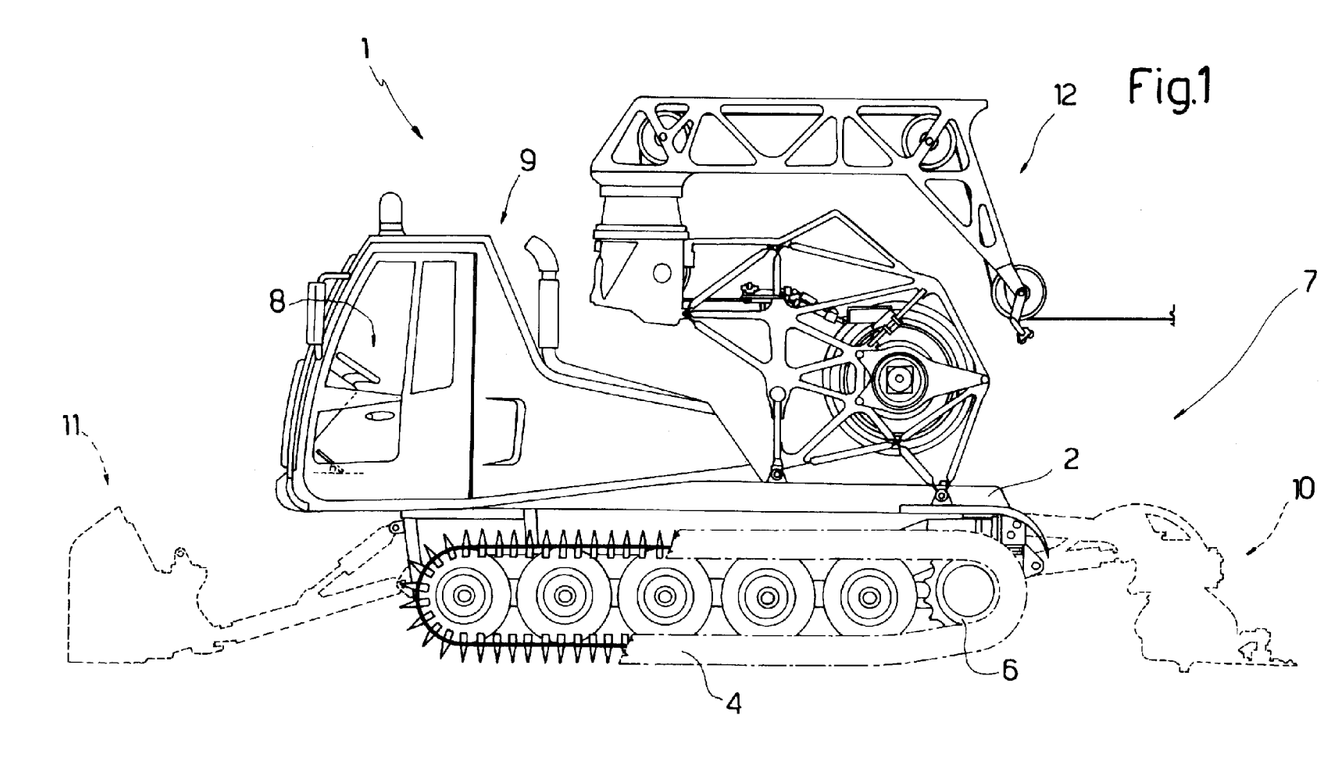
FIG. 1 shows a side view, with parts removed for clarity, of a snow groomer in accordance with the present invention.

Number 1 in FIG. 1 indicates as a whole a ski slope snow groomer, which comprises a frame 2; a first track 3 (FIG. 2); a second track 4; a first drive wheel 5 (FIG. 2) and a second drive wheel 6 independent of each other and connected to first track 3 (FIG. 2) and second track 4 respectively; a plurality of working devices 7; a user interface 8; and a cab 9.

Figure 2:
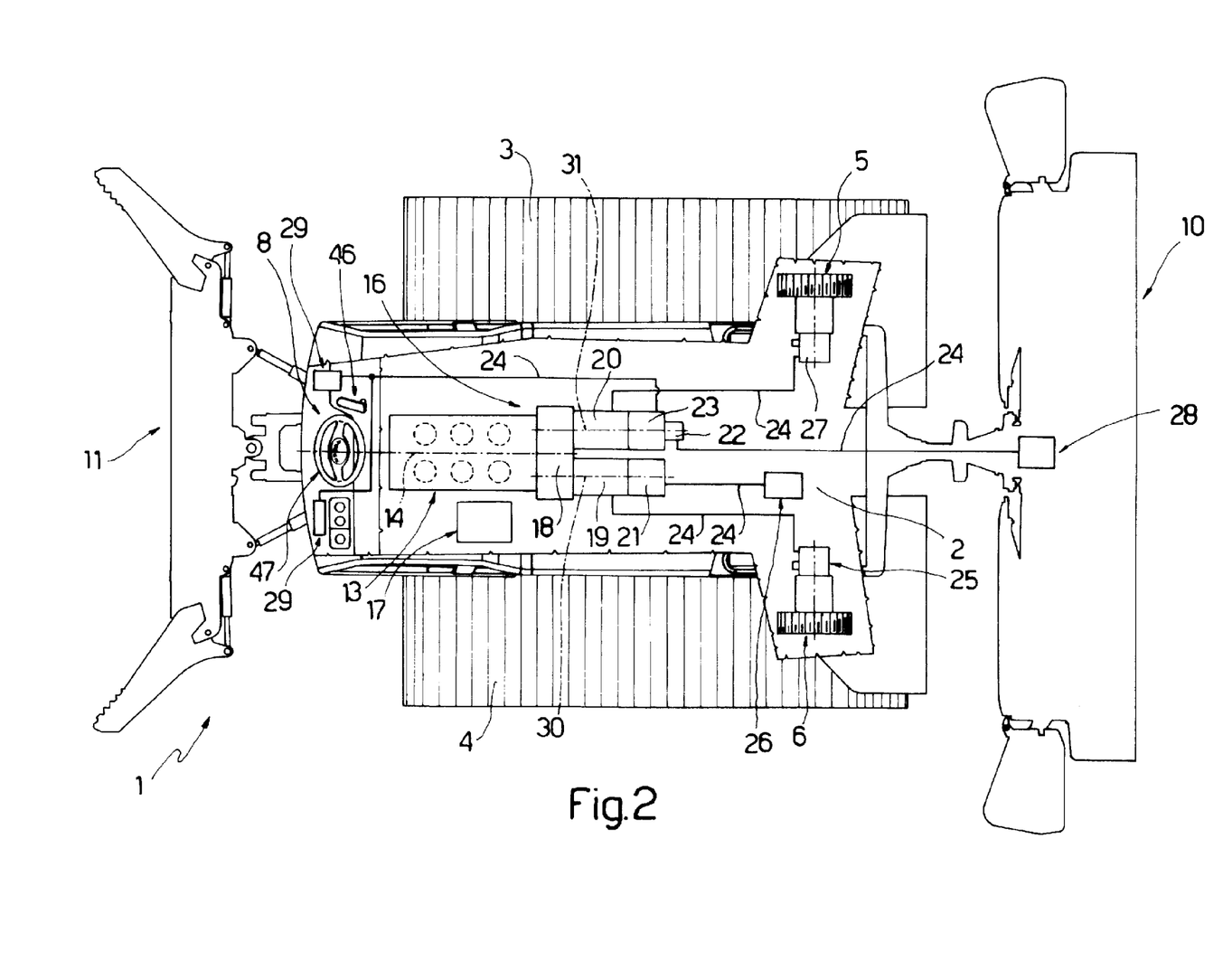
FIG. 2 shows a top plan view, with parts removed for clarity, of the FIG. 1 snow groomer.

With reference to FIG. 2, in the example shown, working devices 7 (FIG. 1) comprise first drive wheel 5, second drive wheel 6, a tiller 10, a shovel 11, and a winch 12 (FIG. 1).

With reference to FIG. 2, snow groomer 1 comprises an internal combustion engine 13 having a drive shaft 14 and an electronic central control unit 15 (FIG. 3); a power transmission 16 connected functionally to drive shaft 14 and for connecting internal combustion engine 13 to working devices 7 (FIG. 1); and a control unit 17 for determining a total power demand $P_W$ of working devices 7 (FIG. 1), and for controlling internal combustion engine 13 and power transmission 16.

Figure 4:
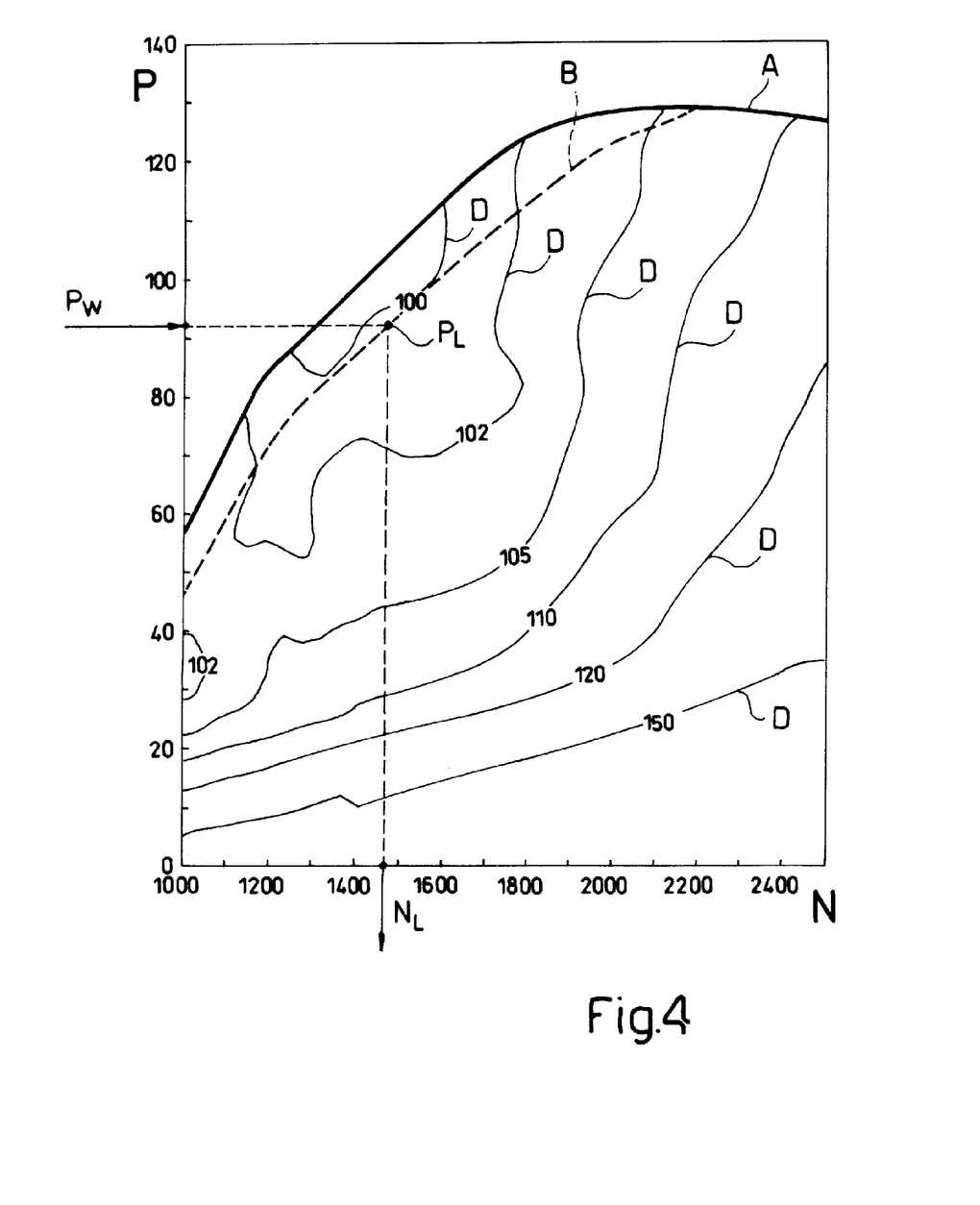
FIG. 4 shows a characteristic graph of fuel consumption with respect to power output and speed of the internal combustion engine of the FIG. 1 snow groomer.

Internal combustion engine 13 is a diesel engine having a power output P as a function of a speed N of internal combustion engine 13, as shown in the characteristic graph of internal combustion engine 13 in FIG. 4. With reference to FIG. 4, the characteristic graph shows speed N along the x axis; power output P along the y axis; a curve A indicating a maximum power output $P_M$ for each speed N; an operating curve B which, over at least a portion and for the same speeds N, has power outputs P lower than the maximum power outputs $P_M$ of curve A, so as to have a power reserve; and lines D defining a map of the area below curve A, and operating areas characterized by average consumptions indicated along lines D. The power reserve is defined as the difference between maximum power output $P_M$ and power output P at a given speed N of internal combustion engine 13, and ensures a certain amount of power is available in the event of a sudden increase in load, and hence fast response of the snow groomer 1 to rapidly-changing commands and loads.

With reference to FIGS. 2 and 4, control unit 17 determines a work point $P_L$ in the characteristic graph of internal combustion engine 13 as a function of the total power demand $P_W$ of working devices 7 and the consumption of internal combustion engine 13. More specifically, work point $P_L$ is selected along operating curve B, which, for each power output P of internal combustion engine 13, defines a respective speed N of internal combustion engine 13 on the basis of the consumption and maximum power output $P_M$ of internal combustion engine 13, so as to optimize consumption and have a power reserve. Operating curve B can be adjusted to specific customer requirements, and in particular to optimize fuel consumption, or increase the power reserve, or balance power reserve and optimum fuel consumption.

Accordingly, user interface 8 comprises a selector device for selecting various operating modes, which operate to privilege energy saving, i.e. optimum consumption, or power reserve, or to balance power reserve and fuel consumption, and are associated with different operating curves B determined according to the operating modes.

Power transmission 16 is predominantly hydraulic, and comprises a mechanical transmission 18; five pumps 19, 20, 21, 22, 23; hydraulic lines 24, preferably hoses; and five hydraulic actuators 25, 26, 27, 28, 29.

Mechanical transmission 18 is connected to drive shaft 14, and has two output shafts 30, 31 connected respectively to a first group of pumps comprising pumps 19, 21, and to a second group of pumps comprising pumps 20, 22, 23, to transmit power received from drive shaft 14.

Pumps 19, 20, 21, 22, 23 are connected by hydraulic lines 24 to respective hydraulic actuators 25, 27, 26, 28, 29.

Pumps 19, 20, 21, 22, 23, or a selected group of pumps 19, 20, 21, 22, 23, are preferably variable-displacement.

Figure 3:
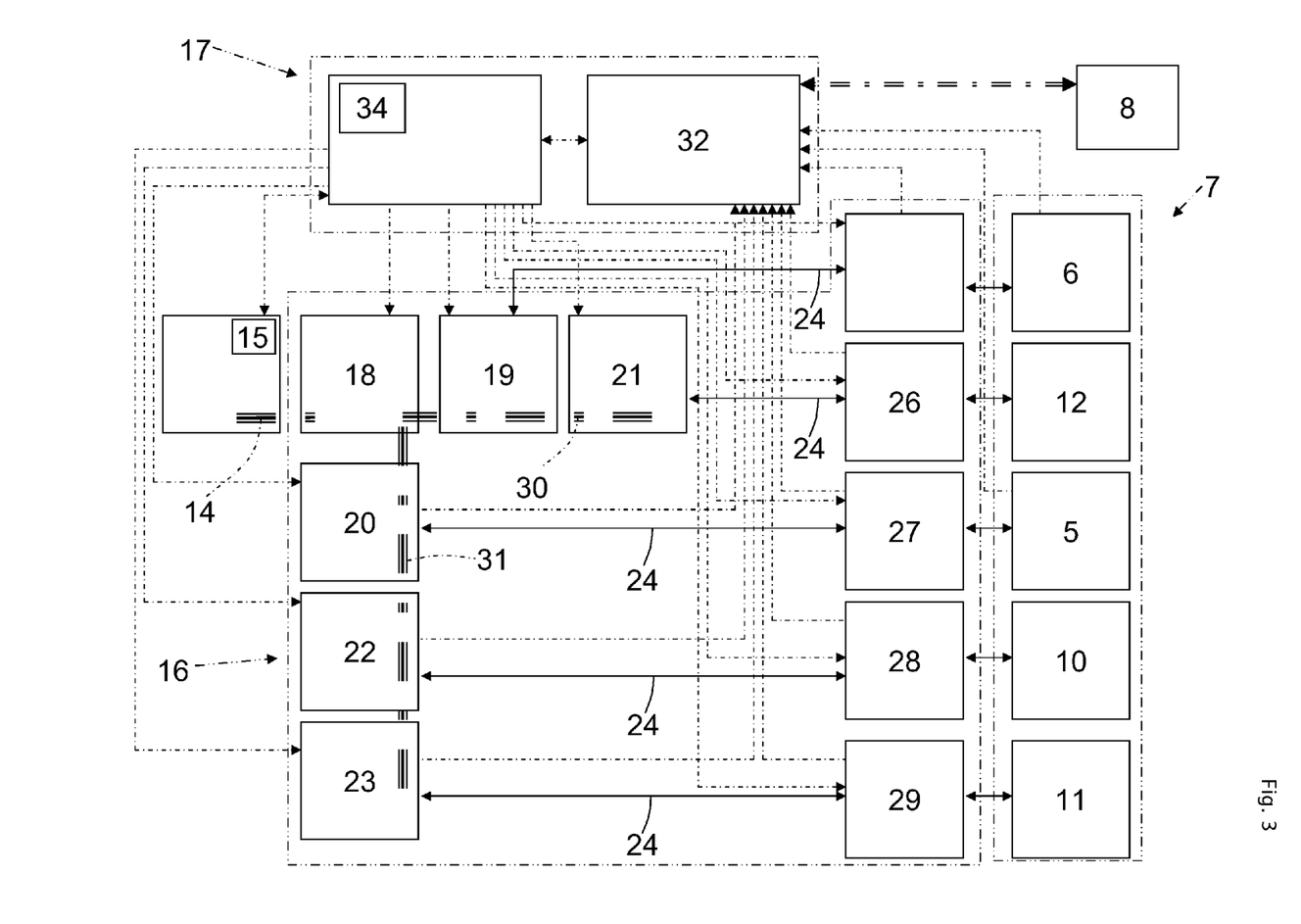
FIG. 3 shows a block diagram of the FIG. 1 snow groomer.

With reference to FIG. 3, control unit 17 comprises a computing block 32; and a computing block 33 with a memory 34. Computing blocks 32, 33 are connected to each other and to internal combustion engine 13, pumps 19, 20, 21, 22, 23, hydraulic actuators 25, 26, 27, 28, 29, first drive wheel 5, second drive wheel 6, tiller 10, shovel 11, and winch 12.

Computing block 32 receives commands from user interface 8, and is configured to determine a power draw by hydraulic actuators 25, 26, 27, 28, 29, a first speed of first drive wheel 5, and a second speed of second drive wheel 6, and to determine the total power demand $P_W$ to execute the commands from user interface 8. Computing block 33 determines the work point $P_L$ of internal combustion engine 13 on the basis of the total power demand $P_W$ of working devices 7 along operating curve B. Work point $P_L$ defines a work speed $N_L$ of internal combustion engine 13, and computing block 33 determines work speed $N_L$ from work point $P_L$, and also determines a work torque $C_L$ on the basis of total power demand $P_W$ and work speed $N_L$.

Computing block 33 transmits work speed $N_L$ to electronic central control unit 15 of internal combustion engine 13, and at the same time commands pumps 19, 20, 21, 22, 23 and/or hydraulic actuators 25, 26, 27, 28, 29 to adjust the velocity ratio and impose a resisting toque $C_r$ on internal combustion engine 13 substantially equal to the previously determined work torque $C_L$. In other words, control unit 17, mechanical transmission 18, hydraulic pumps 19, 20, 21, 22, 23, and hydraulic actuators 25, 26, 27, 28, 29 define adjusting means for adjusting resisting torque $C_r$.

Memory 34 of computing block 33 contains priority levels for working devices 7. When the total power demand $P_W$ of working devices 7 exceeds the maximum power output $P_M$ of internal combustion engine 13, computing block 33 decides, on the basis of the priority level of each working device, which of the working devices—first drive wheel 5, second drive wheel 6, tiller 10, shovel 11, winch 12—to power, so that total power demand $P_W$ equals the maximum power output $P_M$ of internal combustion engine 13, thus ensuring operation of first drive wheel 5, or second drive wheel 6, or tiller 10, or shovel 11, or winch 12, depending on the respective priority levels.

Appropriately assigning the priority levels enhances the overall safety of the system.

For example, assuming first drive wheel 5 and second drive wheel 6 are assigned high priority levels, winch 12 is assigned an intermediate priority level, and tiller 10 and shovel 11 are assigned low priority levels, and assuming a power demand by each working device 7 and a total power demand $P_W$ in excess of maximum power output $P_M$, control unit 17 would first power first drive wheel 5 and second drive wheel 6, then winch 12, if any power output P is left, and ultimately shovel 11 and tiller 10, if any more power output P is available. The above is simply an example, the configuration and priority levels being selectable at random.

As stated, the priority levels are programmable. Accordingly, user interface 8 comprises a communication port for connection to an external programming device, which configures control unit 17 to assign, and store in memory 34, the priority levels of first drive wheel 5, second drive wheel 6, tiller 10, shovel 11, and winch 12.

With reference to FIG. 2, user interface 8 comprises a first control device 46, e.g. an accelerator pedal, to select a travelling speed of snow groomer 1; and a second control device 47, e.g. a steering device, to select a turn angle of snow groomer 1.

Operating as described above, control unit 17, on the basis of information from user interface 8 (operating configurations of first and second control device 46, 47), calculates a first desired speed of first drive wheel 5, and a second desired speed of second drive wheel 6, so that snow groomer 1 travels at the speed selected by first control device 46, and with the turn angle selected by second control device 47.

Memory 34 contains the operating curves B associated with the various operating modes. In actual use, user interface 8 is configured to send out selection commands to select one of operating curves B; and computing block 33 is configured to receive the selection command and determine work speed $N_L$ on the basis of the selected operating curve B. Operating curves B associated with the various operating modes comprise operating curves B that optimize fuel consumption or maximize the power reserve, or intermediate curves that, in various ways, balance power reserve and fuel consumption.

Figure 5:
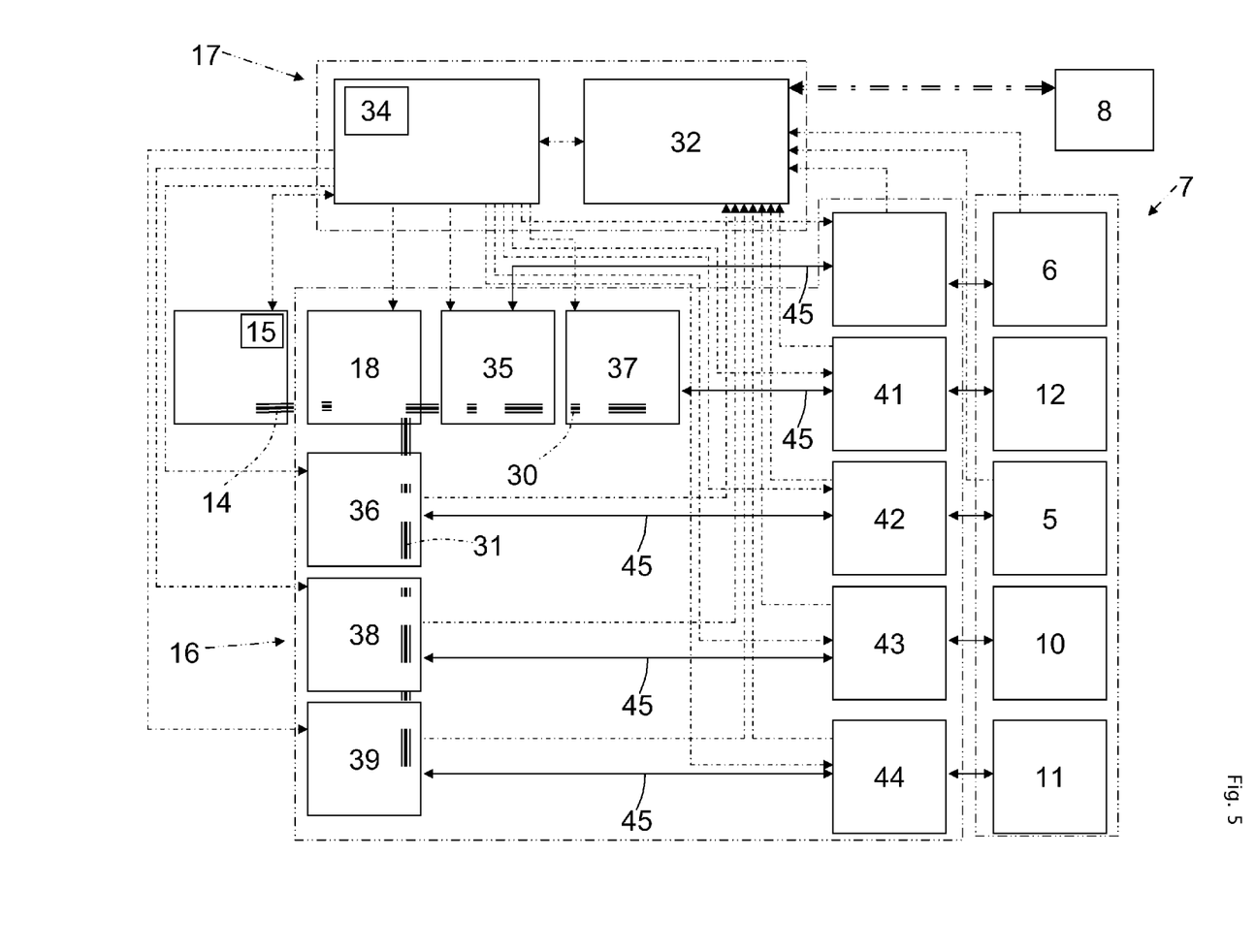
FIG. 5 shows a block diagram of an alternative embodiment of the FIG. 1 snow groomer.

In an alternative embodiment in FIG. 5, power transmission 16 is predominantly electric; pumps 19, 20, 21, 22, 23 of snow groomer 1 described above are replaced by electric generators 35, 36, 37, 38, 39; hydraulic actuators 25, 26, 27, 28, 29 are replaced by electric actuators 40, 41, 42, 43, 44; and hydraulic lines 24 are replaced by electric cables 44.

First drive wheel 5 and second drive wheel 6 are connected mechanically to respective electric actuators 42 and 40, which are electric motors connected electrically to respective electric generators 36 and 35 by electric cables 45; and electric generators 35, 36, 37, 38, 39 are connected mechanically to internal combustion engine 13 by mechanical transmission 18.

Computing block 33 transmits work speed $N_L$ to electronic central control unit 15 of internal combustion engine 13, and at the same time commands mechanical transmission 18, electric generators 35, 36, 37, 38, 39 and/or electric actuators

40, 41, 42, 43, 44 to adjust the velocity ratio and impose a resisting torque $C_r$ on internal combustion engine 13 substantially equal to the previously determined work torque $C_L$. In other words, control unit 17, mechanical transmission 18, electric generators 35, 36, 37, 38, 39, and electric actuators 40, 41, 42, 43, 44 define adjusting means for adjusting resisting torque $C_r$.

Figure 6:
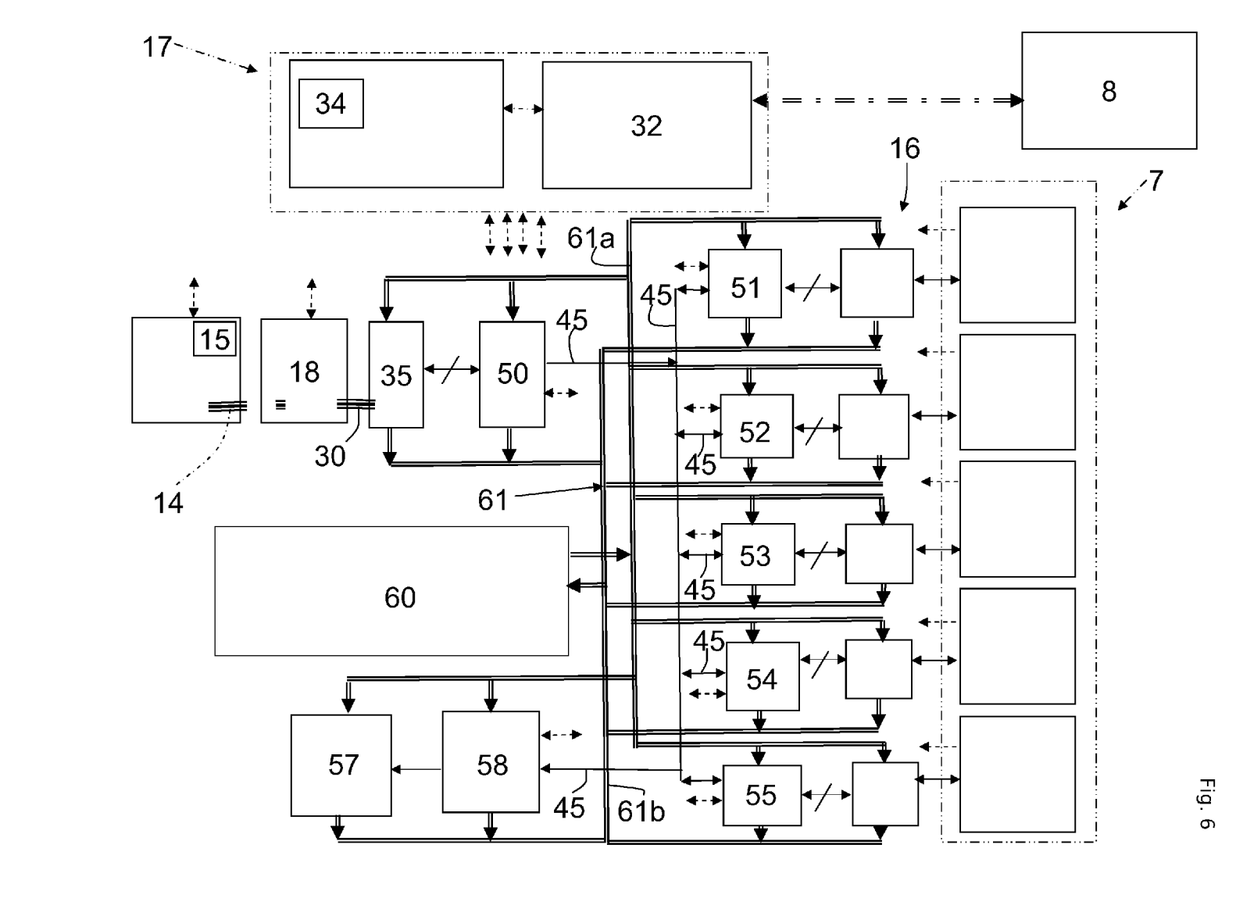
FIG. 6 shows a block diagram of a further alternative embodiment of the FIG. 1 snow groomer.

In a preferred embodiment in FIG. 6, power transmission 16 comprises a single electric generator 35 connected mechanically to internal combustion engine 13 by mechanical transmission 18 and to shaft 30. Electric generator 35 is a multiphase, in particular three-phase, electric generator, e.g. a synchronous three-phase generator with a rotor comprising permanent magnets, or an asynchronous three-phase generator. Power transmission 16 comprises a driver device 50, e.g. an inverter, connected electrically to electric generator 35 and comprising power switches, e.g. power MOSFETs or IGBTs. Driver device 50 is configured to control electric generator 35 by acting on the power switches to convert the multiphase output voltage from electric generator 35 to direct voltage; is connected to control unit 17, more specifically to computing block 33, to receive a signal indicating work torque $C_L$; and acts on the power switches, on the basis of the work torque $C_L$ signal from computing block 33, so that electric generator 35 imposes a resisting torque $C_r$ on internal combustion engine 13 equal to the work torque $C_L$ indicated by the signal from computing block 33. Driver device 50 may operate in any torque control mode, e.g. scalar control, vector control, or direct torque control.

Driver device 50 is connected to electric cables 45 to supply direct voltage.

Power transmission 16 comprises driver devices 51, 52, 53, 54, 55, each connected to and for powering and controlling respective electric actuator 40, 41, 42, 43, 44. More specifically, electric actuators 40, 41, 42, 43 are multiphase, in particular three-phase, electric motors, e.g. synchronous three-phase motors with a rotor comprising permanent magnets, or asynchronous three-phase motors. The respective driver device 51, 52, 53, of each electric actuator 40, 41, 42, 43 is, for example, an inverter comprising power switches, e.g. power IGBTs or MOSFETs; is configured to control respective electric actuator 40, 41, 42, 43 by acting on the voltage and/or current and/or frequency to respective electric actuator 40, 41, 42, 43; is connected to computing block 33 to receive a signal indicating a desired torque of respective actuator 40, 41, 42, 43; and acts on the respective power switches, on the basis of the signal indicative of the desired torque, received from computing block 33, so that respective actuator 40, 41, 42, 43 supplies respective working device 7 with a torque equal to the desired torque. Each driver device 51, 52, 53, 54 may operate in any torque control mode, e.g. scalar control, vector control, or direct torque control.

Actuators 40, 41, 42, 43 are also configured for use as electric generators, and the desired-torque signals may indicate positive or negative desired-torque values, depending on whether the actuator 40, 41, 42, 43 is used as a motor or generator. In the latter case, actuators 40, 41, 42, 43, by means of driver devices 51, 52, 53, 54, feed electric power to cables 45.

Snow groomer 1 also comprises an electric resistor 57, and power transmission 16 comprises a driver device 58 for connecting electric resistor 57 to electric cables 45. Driver device 58 is connected to computing block 33 to receive an braking signal, and is configured to connect electric resistor 57 totally or partly to electric cables 45, depending on the braking signal received, to dissipate the electric power fed to electric cables 45 when one or more of actuators 40, 41, 42, 43 operate as generators.

Driver devices 50, 51, 52, 53, 54, 55 are liquid-cooled, so each comprises a compartment (not shown) designed to permit flow of a cooling liquid. The compartment comprises a heat-conducting wall (not shown), on which the parts of respective driver device 50, 51, 52, 53, 54, 55 subject to most heating, such as the power switches, are located; and each driver device 50, 51, 52, 53, 54 comprises an inlet for cold cooling liquid flow into the compartment, and an outlet for hot cooling liquid flow out of the compartment.

Resistor 57 comprises a compartment designed to permit cooling liquid flow to cool resistor 57, which accordingly comprises an inlet for cold cooling liquid flow into the compartment, and an outlet for hot cooling liquid flow out of the compartment.

Snow groomer 1 comprises a radiator 60; and a hydraulic circuit 61 for connecting radiator 60 to driver devices 50, 51, 52, 53, 54, 55 and to resistor 57. Hydraulic circuit 61 comprises a delivery branch 61a, along which the cold cooling liquid from radiator 60 flows into the cooling compartments; and a return branch 61b, along which the hot cooling liquid from and heated by the compartments flows. Radiator 60 has a fan connected to an electric motor (not shown), which is activated when the cooling liquid exceeds a given threshold temperature, and which is powered by electric cables 45.

In a preferred, non-limiting embodiment of the present invention, generator 35 and electric actuators 40, 41, 42, 43, 44 are liquid-cooled, so generator 35 and electric actuators 40, 41, 42, 43, 44 each comprise a compartment (not shown) designed to permit cooling liquid flow. The compartment extends at least partly about respective generator 35 or electric actuator 40, 41, 42, 43, 44; and generator 35 and electric actuators 40, 41, 42, 43, 44 each comprise an inlet for cold cooling liquid flow into the compartment, and an outlet for hot cooling liquid flow out of the compartment.

Hydraulic circuit 61 is designed to connect radiator 60 to generator 35 and electric actuators 40, 41, 42, 43, 44.

Driver device 58 is liquid-cooled by radiator 60 and hydraulic circuit 61.

The present invention obviously also covers embodiments not described in the above detailed disclosure, and equivalent embodiments within the protective scope of the accompanying Claims.

The invention claimed is:

1. A snow groomer comprising a first and second track; an internal combustion engine; a power transmission; a plurality of working devices connected to the internal combustion engine by the power transmission; a user interface; and a control unit comprising a first computing block for determining a total power demand of said working devices, and a second computing block for determining a work point in a characteristic graph of the internal combustion engine as a function of total power demand and the fuel consumption of the internal combustion engine; wherein the second computing block determines the work point in the characteristic graph of the internal combustion engine as a function of a power reserve of the internal combustion engine.

2. A snow groomer as claimed in claim 1, wherein the work point is defined by a power output of the internal combustion engine equal to total power demand, and defines a work speed of the internal combustion engine.

3. A snow groomer as claimed in claim 1, wherein the second computing block comprises at least one operating curve defined on the basis of the fuel consumption of the internal combustion engine and a maximum power output; and wherein the work point is located along the operating curve.

4. A snow groomer as claimed in claim 3, wherein the operating curve can be adjusted to optimize fuel consumption, or increase a power reserve, or balance the power reserve and optimum fuel consumption.

5. A snow groomer as claimed in claim 4, wherein the user interface comprises a selector device for adjusting the operating curve; and the second computing block comprises a memory for storing a plurality of different operating curves; the second computing block being connected to the user interface to receive a selection command to select the operating curve from the plurality of operating curves.

6. A snow groomer as claimed in claim 2, wherein the second computing block is configured to determine the work speed of the internal combustion engine as a function of the operating curve.

7. A snow groomer as claimed in claim 1, wherein the second computing block is configured to determine a work torque of the internal combustion engine as a function of the work point.

8. A snow groomer as claimed in claim 7, comprising adjusting means for adjusting a velocity ratio of the power transmission, so as to apply to the internal combustion engine a resisting torque substantially equal to the work torque.

9. A snow groomer as claimed in claim 1, wherein the power transmission comprises at least one electric generator connected mechanically to the internal combustion engine; and at least one electric actuator.

10. A snow groomer as claimed in claim 1, wherein the power transmission comprises at least one hydraulic pump connected mechanically to the internal combustion engine; and at least one hydraulic actuator connected functionally to one of the working devices, and hydraulically to the hydraulic pump.

11. A snow groomer as claimed in claim 1, wherein the second computing block comprises a memory storing a priority level for each working device; the second computing block acting on the power transmission to power each working device according to its assigned priority level.

12. A snow groomer as claimed in claim 1, wherein said working devices comprise a first and second drive wheel connected respectively to the first and second track; the user interface comprising a first control device for selecting a travelling speed of the snow groomer; the user interface; and the control unit.

13. A snow groomer as claimed in claim 1, and comprising a radiator for cooling the power transmission; and a hydraulic circuit for connecting the radiator to the power transmission; the power transmission preferably being electric.

14. A snow groomer as claimed in claim 13, wherein the power transmission comprises at least one liquid-cooled driver device connected to the radiator by the hydraulic circuit.

15. A snow groomer as claimed in claim 13, wherein the power transmission comprises a generator and/or at least one electric actuator liquid-cooled and connected to the radiator by the hydraulic circuit; and the snow groomer comprises a liquid-cooled electric resistor connected to the radiator by the hydraulic circuit.

16. A snow groomer as claimed in claim 3, wherein the second computing block is configured to determine the work speed of the internal combustion engine as a function of the operating curve.

17. A snow groomer as claimed in claim 9 wherein the actuator is an electric motor, connected functionally to one of the working devices, and electrically to the electric generator.

18. A snow groomer as claimed in claim 12 wherein the user interface comprises a second control device for selecting a turn angle of the snow groomer; and wherein the control unit is connected to the first and second control device and to the power transmission to determine a first desired speed of the first drive wheel and a second desired speed of the second drive wheel as a function of the operating configurations of the first and second control device.

19. A method of controlling a snow groomer; the snow groomer comprising a first and second track; an internal combustion engine; a power transmission; a plurality of working devices connected to the internal combustion engine by the power transmission; and a user interface; the method comprising the steps of determining a total power demand of said working devices; and determining a work point in a characteristic graph of the internal combustion engine as a function of total power demand, the fuel consumption and a power reserve of the internal combustion engine.

20. A method as claimed in claim 19, comprising the steps of defining an operating curve in said characteristic graph; and selecting the work point along the operating curve; and wherein the step of defining the operating curve in said characteristic graph comprises selecting said operating curve from a plurality of operating curves predefined as a function of fuel consumption and a power reserve.

21. A method as claimed in claim 19, comprising the step of determining a work torque of the internal combustion engine as a function of the work point.

22. A method as claimed in claim 21, comprising the step of adjusting a velocity ratio of the power transmission, so as to apply to the internal combustion engine a resisting torque substantially equal to the work torque.

23. A method as claimed in claim 19, comprising the step of assigning a priority level to each working device, and powering each working device via the power transmission according to the assigned priority level.

* * * * *